Sept. 21, 1943.　　　　S. LUBRANI　　　　2,329,996
FOUNTAIN PEN
Filed Dec. 7, 1942
FIGURE I
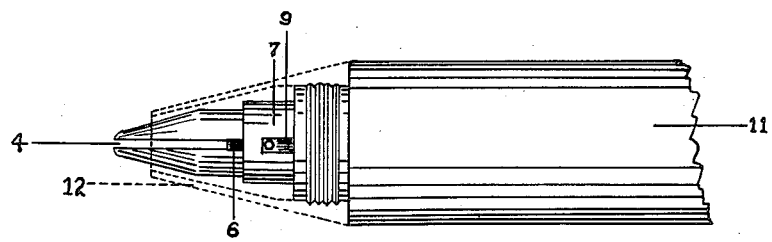
FIGURE II
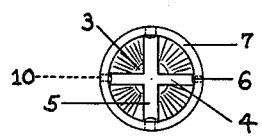
FIGURE III
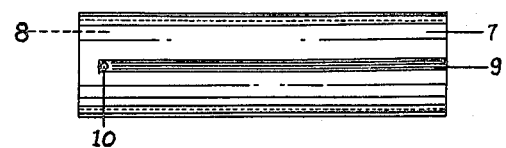
FIGURE IV
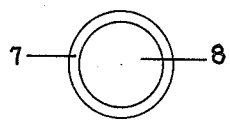
FIGURE V
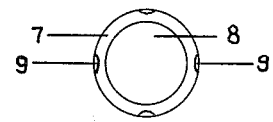
FIGURE VI
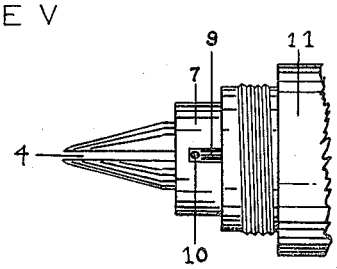
FIGURE VII
SILIO LUBRANI
　　　　*INVENTOR.*
BY Norman N. Popper
　　　　*attorney*

Patented Sept. 21, 1943

2,329,996

UNITED STATES PATENT OFFICE 2,329,996

FOUNTAIN PEN

Silio Lubrani, Union, N. J.

Application December 7, 1942, Serial No. 468,073

1 Claim. (Cl. 120—43)

My invention relates generally to improvements in fountain pens, and specifically to pen points and ink feed bars used in conjunction therewith.

Fountain pens have heretofore been provided with the familiar curved semicylindrical point with a slit running from the tip, into which the ink is fed by the feed bar. Such points frequently become clogged with dried ink. The ink in most cases will not feed in certain positions in which the point is held. Best results are had when the point is held with the ink slit uppermost. The finer the point, the finer the ink slit must be; and the finer the ink slit, the greater the difficulties that arise from the clogging of the ink slit with sediment or dried particles of ink. Heretofore, fountain pens have also been provided with stylographic points. These points frequently are hollow, and readily become clogged. Both types of points are easily damaged and put out of repair; this is particularly true of the semicylindrical point in which the portions on either side of the ink slit are often bent out of alignment.

It is an object of my invention to provide a pen with a point that will write in any position; it is a further object of my invention to provide a point that has a plurality of ink slits, so that regardless of how the point is applied to the paper, there will nevertheless be an ink slit ready to feed ink onto the paper. Still further, is the object of providing a point with a slit that is not of very great extent or length, as the greater the length of the ink slit, the less is the strength of the point; as a result my invention achieves a point of relatively great strength that is not damaged by rough usage. Another advantage of such a point is that it enables the making of many carbon copies, that it may be formed to write very fine lines without a weakening of the point, and without increasing the tendency of the ink slit to be clogged with ink residue or dried ink particles. Such a point has the further advantage of being susceptible to being covered with a screen, shield or holder down to almost the tip of the point which makes for greater facility in holding it to write, and serves further to protect the point from damage while in use since the major portion of its extent is shielded from contact with other objects which might damage it. Other objects and advantages from my new construction will become apparent from the detailed description hereinafter set forth and the accompanying drawing in which:

Figure I is a view in perspective of the point disassembled from the pen;

Figure II is a view of the point assembled with the feed bar and the body of the pen;

Figure III is an end view of the point inserted in the feed bar looking toward the inner end;

Figure IV is a side view of the feed bar;

Figure V is an end view of the feed bar looking toward the outer end;

Figure VI is an opposite end view of the feed bar;

Figure VII is a view of the point assembled with the feed bar and the body of the pen.

Referring now more particularly to the illustration of the invention embodied in the drawing, the pen point 1 has a body 2 cylindrical in form with a slight taper to the tip 3. This is the preferred embodiment, although the point 1 may be oval, triangular, square or even irregular in form, or with many sides. The tip 3 is provided with a slit 4 running completely through the body and extending a brief distance toward the opposite end of the body 2. Another transverse slit 5 may be provided running through the body and extending a similar distance toward the opposite end of the body 2. Of course these slits 4, 5 will intersect each other. In the preferred embodiment of my invention, two slits at right angles to each other are found most satisfactory; however a plurality of slits may be used; their preferred extent is no greater than one quarter of an inch. From the point where the slits 4, 5 end and at the outer surface of the body 2, a groove or channels 6 are formed and extend to the opposite end of the body 2. Such channels 6 may be supplied for each of the ends of the slits 4, 5. They serve to supplement the ink that may be conveyed to the tip 3 by the feed bar hereinafter referred to. These grooves or channels 6 are to be regarded merely as accessory or optional features not essential to the proper functioning of the pen point, and therefore they need not be used or may be eliminated altogether.

A hollow cylindrical feed bar 7 serves as the principal source of ink supply for the pen point 1. It has a central passage 8 of substantially the same diameter or configuration as the pen point 1 so that the pen point may be positioned within it and frictionally held in place. The outer surface of the feed bar 7 is supplied with an ink channel 9 running from the inner end not quite to the outer end and terminating in a hole 10 communicating with the hollow interior of the feed bar, whereby the ink may be fed into the slits 4, 5 of the pen point 1 as will appear in Figure VII. Similar appropriately spaced ink channels 9 terminating in holes 10 may be located at other points on the feed bar 7 so that ink passing along them may feed into the holes and be deposited into the slits 4, 5, but these additional ink channels 9 are merely accessory or optional, one being enough. By positioning the pen point 1 at a different position in the feed bar 7, so that the hole 10 corresponds in position with the channel 6, the ink instead of being fed directly into the slits 4, 5 may be fed into the channels and run down them into the slits. This is an optional manner of operation. The preferred manner of operation is however the manner illustrated in Figure VII where the ink is fed directly into the slits 4, 5. The alternative method of operation pictured in Figure II illustrates the position of the parts when the ink is fed into the channels 6. Of course many types of feed bars may be used; any type whereby ink is delivered by a simple channel to the slits 4, 5 will be satisfactory.

A conventional pen body 11 or ink reservoir completes the assemblage. The feed bar 7 is of substantially the same diameter as the inside diameter of the reservoir 11, so that it may be pressed into the same and be there frictionally held in place. As an optional feature, a shield or guard 12 may be screwed into place on the body 11 to enclose and protect the pen point and feed bar except for the tip 3 which protrudes therefrom.

In operation, a cap is removed from the body 11 and the pen elevated to a suitable writing position, whereupon ink will flow down the ink channel 9, into the hole 10 and directly into the slits 4, 5 as in Figure VII. But if as aforementioned, the auxiliary grooves 6 are provided, these will also serve to feed ink as in Figure II. The ink will flow to the very tip 3 of the point and will be at all times ready to flow with the movement of the point 1 over the writing surface. By reason of the plurality of slits 4, 5 a supply of ink is always at hand, no matter how the point is held, ready to flow at the lightest application of the point to the paper. The point itself is preferably made of gold to insure resiliency, freedom from corrosion; it should be tipped in conventional manner with iridium or some other suitable material to insure long wear and smoothness. The feed bar may be of rubber or plastic. However, these specifications of material are merely intended as illustrative as many substitutes will readily suggest themselves.

It will be observed from the foregoing description that my invention provides a novel point and feed bar construction by which ink is continuously and expeditiously supplied from the ink reservoir to the point, and a point that is relatively impervious to damage. It is apparent that the invention is not limited to the presently disclosed precise construction as many variations within the scope of the claim may be devised without departing from the spirit of the invention. It is also apparent that all of the features of the invention need not necessarily be conjoined in the same pen as certain features may be used to advantage by way of combination and subcombination.

I claim:

A fountain pen comprising an ink reservoir, a hollow feed bar positioned in the ink reservoir, and adapted to receive a pen point, an ink channel on the feed bar, a hole in the ink channel; a pen point tapered at one end, frictionally positioned in the hollow of the feed bar, and having a plurality of slits in the tapered end, the inner end of a slit arranged in substantial alignment with the hole in the ink channel of the feed bar.

SILIO LUBRANI.